(12) United States Patent
Amit et al.

(10) Patent No.: US 9,208,309 B2
(45) Date of Patent: *Dec. 8, 2015

(54) DYNAMICALLY SCANNING A WEB APPLICATION THROUGH USE OF WEB TRAFFIC INFORMATION

(75) Inventors: Yair Amit, Tel-Aviv (IL); Ronen Bachar, Kiryat Ono (IL); Lotem Guy, Tel-Aviv (IL); Igal Kreichman, Haifa (IL); Ron Nordan, Tel-Aviv (IL); Roi Saltzman, Hertzliya (IL); Ori Segal, Tel-Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/563,279

(22) Filed: Jul. 31, 2012

(65) Prior Publication Data

US 2013/0191913 A1 Jul. 25, 2013

Related U.S. Application Data

(63) Continuation of application No. 13/357,251, filed on Jan. 24, 2012.

(51) Int. Cl.
*G06F 21/00* (2013.01)
*G06F 15/16* (2006.01)
*G06F 21/55* (2013.01)
*H04L 29/06* (2006.01)

(52) U.S. Cl.
CPC ............ *G06F 21/552* (2013.01); *H04L 63/166* (2013.01)

(58) Field of Classification Search
CPC ...... G06F 21/55; G06F 21/552; H04L 63/166
See application file for complete search history.

(56) References Cited

U.S. PATENT DOCUMENTS

| 6,574,617 | B1 | | 6/2003 | Immerman et al. |
|---|---|---|---|---|
| 7,027,975 | B1 | * | 4/2006 | Pazandak et al. ................. 704/9 |
| 7,406,627 | B2 | | 7/2008 | Bailey et al. |
| 7,984,015 | B2 | | 7/2011 | Dias et al. |
| 8,370,929 | B1 | * | 2/2013 | Pennington et al. ............ 726/22 |

(Continued)

FOREIGN PATENT DOCUMENTS

| CN | 101399658 A | 4/2009 |
|---|---|---|
| CN | 101902470 A | 12/2010 |

(Continued)

OTHER PUBLICATIONS

Osherove, "Turn Your Log Files into Searchable Data Using Regex and the XML Classes," Microsoft Library, Jan. 2004, pp. 1-12.*

(Continued)

*Primary Examiner* — Kaveh Abrishamkar
*Assistant Examiner* — James J Wilcox
(74) *Attorney, Agent, or Firm* — Cuenot, Forsythe & Kim, LLC

(57) ABSTRACT

Collecting log file data from at least one log file. From the collected log file data, at least one HTTP request can be generated to exercise a web application to perform a security analysis of the web application. The HTTP request can be communicated to the web application. At least one HTTP response to the HTTP request can be received. The HTTP response can be analyzed to perform validation of the web application. Results of the validation can be output.

8 Claims, 3 Drawing Sheets

(56) References Cited

U.S. PATENT DOCUMENTS

| | | | |
|---|---|---|---|
| 2002/0133723 A1* | 9/2002 | Tait | 713/201 |
| 2003/0177252 A1* | 9/2003 | Krichevski et al. | 709/230 |
| 2003/0233581 A1* | 12/2003 | Reshef et al. | 713/201 |
| 2005/0138426 A1* | 6/2005 | Styslinger | 713/201 |
| 2005/0138483 A1* | 6/2005 | Hatonen et al. | 714/45 |
| 2006/0133377 A1* | 6/2006 | Jain | 370/392 |
| 2006/0146816 A1* | 7/2006 | Jain | 370/389 |
| 2007/0288840 A1* | 12/2007 | Girle et al. | 715/513 |
| 2009/0119777 A1* | 5/2009 | Jeon | 726/25 |
| 2009/0119778 A1* | 5/2009 | Bhuyan | 726/25 |
| 2011/0035784 A1* | 2/2011 | Jakobsson | 726/2 |
| 2012/0167221 A1* | 6/2012 | Kang et al. | 726/24 |
| 2013/0191920 A1 | 7/2013 | Amit et al. | |

FOREIGN PATENT DOCUMENTS

| | | |
|---|---|---|
| CN | 102185930 A | 9/2011 |
| CN | 10406756 A | 9/2014 |
| GB | 2515663 A | 12/2014 |
| WO | 2007038584 A1 | 4/2007 |
| WO | 2013111027 A1 | 8/2013 |

OTHER PUBLICATIONS

W3Schools "The XMLHttpRequest Object", pp. 1-5, Apr. 6, 2008, retrieved from W3 Schools et al ("The XMLHttpRequest Object", w3schools.com, pp. 1-5, Apr. 6, 2008, retrieved from http://web.archive.org/web/20080406183300/http://www.w3schools.com/Dom/dom_httprequest.asp.*

Meyer, "Detecting Attacks on Web Applications from Log Files, SANS Institute InfoSec Reading Room," Jan. 26, 2008, pp. 1-46.*

CodeSecurely Wiki Logging & Auditing, by Rudolph Araujo, 2006 retrieved from https://web.archive.org/web/20080827192235/http://www.codesecurely.org/Wiki/printaspx/Security_Code_Reviews/Logging_Auditing, pp. 1-8.*

MSDN et al (HttpCookieClass .NET Framework 4.5, Retrieved from https://web.archive.org/web/20111029041305/http://msdn.microsoft.com/en-us/library/system.web.httpcookie(v=VS.110).aspx, pp. 1-4).*

Web Application Security Consortium, "Web Application Security Scanner Evaluation Criteria" Version 1.0, 2009, pp. 1-26.*

PCT Appln. No. PCT/IB2013/050266, International Search Report and Written Opinion, Jun. 6, 2013, 8 pg.

U.S. Appl. No. 13/357,251, Non-Final Office Action, Dec. 5, 2013, 26 pg.

U.S. Appl. No. 13/357,251, Final Office Action, May 20, 2014, 35 pg.

U.S. Appl. No. 13/357,251, Advisory Action, Aug. 4, 2014, 3 pg.

U.S. Appl. No. 13/357,251, Non-Final Office Action, Sep. 19, 2014, 32 pg.

U.S. Appl. No. 13/357,251, Final Office Action, Feb. 11, 2015, 39 pg.

U.S. Appl. No. 13/357,251, Advisory Action, Apr. 23, 2015, 3 pg.

* cited by examiner

DYNAMICALLY SCANNING A WEB APPLICATION THROUGH USE OF WEB TRAFFIC INFORMATION

CROSS-REFERENCE TO RELATED APPLICATIONS

This application is a Continuation of U.S. application Ser. No. 13/357,251, filed on Jan. 24, 2012.

BACKGROUND

One or more embodiments disclosed within this specification relate to Web Security Scanners.

Web application security scanners are software tools that automatically test the security posture of web applications. These scanners attempt to locate security issues within web applications, such as structured query language (SQL) injection, cross-site scripting, command injection, and other security vulnerabilities. To use such a scanner, a user typically configures the scope and limits of the scan, and provides login information. The user then manually or automatically crawls the web application to allow the scanner to collect information about the web application's structure, uniform resource locators (URLs) associated with the web application, cookies and directories. The objective of crawling is to collect resources from the web application in order to automate vulnerability detection on each of these resources. The information obtained during crawling of the web application then is manipulated and submitted to the web application to perform testing on the web application, and validation is performed on the responses received from the web application.

BRIEF SUMMARY

One or more embodiments disclosed within this specification relate to dynamically scanning a web application. An embodiment can include collecting log file data from at least one log file. From the collected log file data, at least one HTTP request can be generated to exercise a web application to perform a security analysis of the web application. The HTTP request can be communicated to the web application. At least one HTTP response to the HTTP request can be received. The HTTP response can be analyzed to perform validation of the web application. Results of the validation can be output.

Another embodiment can include a system that dynamically scans a web application. The system can include a computer-readable storage medium and a processor. The processor can be configured to initiate executable operations to perform the various processes and/or functions disclosed within this specification.

Another embodiment can include a computer program product for dynamically scanning a web application. The computer program product can include a computer-readable storage medium having computer-readable program code embodied therewith configured to perform the various operations and/or functions disclosed within this specification.

DETAILED DESCRIPTION

Figure 1:
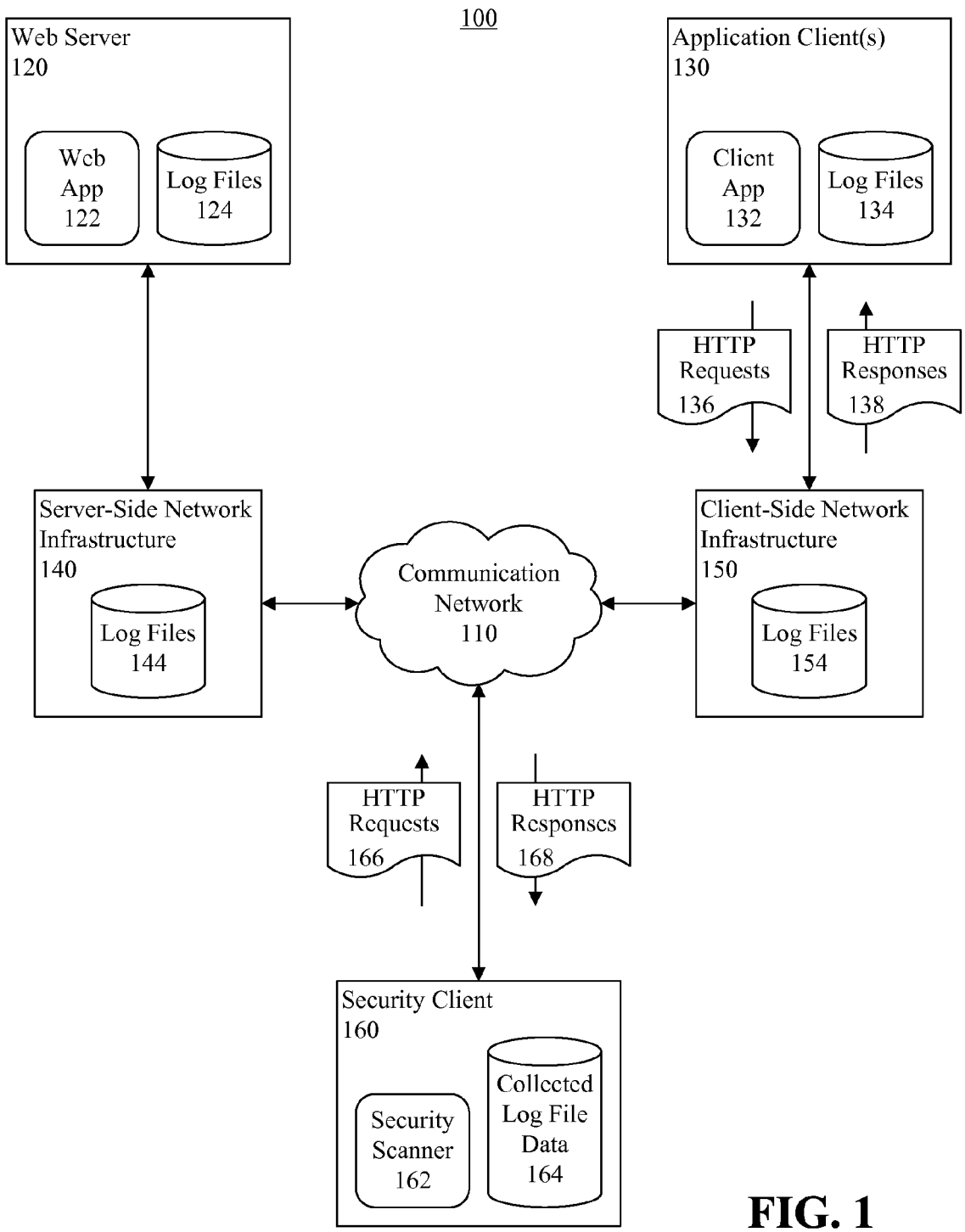
FIG. 1 is a block diagram illustrating a system for dynamically scanning web applications in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present embodiments relate to dynamically scanning web applications. More particularly, data from information logs generated by prior use and/or development of a web application can be accessed. This information can be accessed by a web application security scanner to collect information about the web application's structure. In lieu of, or in addition to, crawling the web application, the web application security scanner can use the accessed information to exercise the web application using known information generated from previous real world interactions with the web application. Thus, the security of the web application can be tested based on these previous real world interactions. These previous interactions may indicate circumstances that otherwise may be missed if mere crawling of the web application is implemented. For example, certain areas of the web application based on user interactions may not be reached using a traditional crawling function, and such areas may be missed using previously known security testing solutions. The present invention, however, via the collected information from the information logs, can identify such areas of the web application, and access such areas during security testing. Thus, through use of the information logs, the web application security scanner can identify security vulnerabilities in the web application that otherwise would be unnoticed, thereby enhancing the security analysis performed by the web application security scanner.

FIG. 1 is a block diagram illustrating a system 100 for dynamically scanning web applications in accordance with one embodiment of the present invention. The system can include a communication network 110 configured to communicatively link one or more systems, such as a web server 120, one or more application clients 130, and/or a security client 160. The communication network 110 can be any type of network, such as any of those previously described.

The system 100 can include the web server 120. The web server 120 can be any processing system that includes at least one processor. The web server 120 further can include memory elements, such as local memory and/or one or more bulk storage devices, as will be described herein. The web server 120 can be configured to host, or execute, a web application 122. The web application 122 can be an application accessible via the communication network 110. The web server 120 also can be configured to store information related to client accesses to the web application 122 and/or information related to responses to such client accesses in one or more log files 124.

The system 100 also can include one or more application clients 130. An application client 130 can be any processing system that includes at least one processor. An application client 130 further can include memory elements, such as local memory and/or one or more bulk storage devices, as will be described herein. Application clients 130 can be configured to execute one or more instances of a client application 132. The client application 132 can be an application configured to access the web application 122 via the communication network 110 in order to retrieve information provided by the web application 122 and/or provide information to the web application 122. For example, during development of the web application 122, the client application 132 can access the web application 122 at the behest of a web application developer who is testing the functionality of the web application 122, or at the behest of any other user of the web application 122. In one embodiment, the client application 132 can be a web browser, though the invention is not limited in this regard. In illustration, the client application 132 can be any other application suitable for exchanging information with the web application 122 via the communication network 110.

The application client(s) 130 also can be configured to store information related to the client application 132 access to the web application 122 in one or more log files 134. For example, in one embodiment, the application client(s) 130 can store in the log files 134 information related to HTTP requests 136 communicated from the client application 132 to the web application 122 and/or HTTP responses 138 communicated from the web application 122 to the client application 132 in response to the HTTP requests 136. In other embodiments, such information can be stored in the log files 124 maintained by the web server 120, or other log files which will be described herein. The HTTP requests 136 can include initial HTTP requests communicated from the client application(s) 130 to the web application 122, as well as post HTTP requests communicated in response to the HTTP responses 138. Similarly, the HTTP responses 138 can include initial HTTP responses communicated from the web application 122 to the client application(s) 130, as well as post HTTP responses communicated in response to post HTTP requests.

Collectively, the HTTP requests 136 and HTTP responses 138 can be referred to as communication traffic. The communication traffic can include uniform resource locators (URLs), asynchronous JavaScript and XML (AJAX) requests and corresponding responses, requests to areas of the web application, HTTP verbs, parameters, data, form values, cookies, post requests, query and/or body parameters, user identifiers, passwords and the like. The URLs can be dynamically generated (e.g., generated based on user interaction with the client application 132), manually generated (e.g., generated based on user inputs), automatically or manually selected, etc. As used herein, a user is a human being.

In one embodiment, the web server 120 and the application client(s) 130 can be communicatively liked via the communication network 110. In another embodiment, the web server 120 and a particular application client 130 can be the same machine. In an embodiment in which the web server 120 is not the same machine as one or more of the application clients 130, network infrastructure can be provided to communicatively link the web server 120 and the application client(s) 130. For example, server-side network infrastructure 140 can be provided to link the web server 120 to the communication network 110 and client-side infrastructure 150 can be provided to communicatively link one or more of the application clients 130 to the communication network 110.

The network infrastructure 140, 150 can include, but are not limited to, network adapters, wireless network adapters, access points, routers, switches, firewalls, gateways, proxy devices or servers, reverse proxy devices or servers, or the like. In this regard, the network infrastructure 140, 150 can be nodes of the communication network 110. Components of the network infrastructure 140, 150 may be shared between the web server 120 and the application client 130. For example, if the web server 120 and the application client 130 are on the same subnet, they each may have or may be linked to a respective network adapter, but share a common router, switch, firewall, gateway, or the like. In this regard, components of the server-side network infrastructure 140 and the client-side infrastructure 150 may be common both to the web server 120 and the application client 130, though this need not be the case.

The server-side network infrastructure 140 and/or the client-side infrastructure 150 also can be configured to store information related to the client application 132 accesses to the web application 122 and/or information related to responses to such accesses in one or more log files 134. For example, the server-side network infrastructure 140 can store such information to one or more log files 144 and the client-side network infrastructure 150 can store such information to one or more log files 154. Since a plurality of application clients 130 may be provided, the log files 134, 154 may be distributed among one or more components of the system 100.

Various types of information related to interactions between instances of the client application 132 and the web application 122 may be stored in the log files 124, 134, 144 and/or 154. Such information can include, but is not limited to, sniffer log data (e.g., Ethereal and/or Wireshark log data), intrusion protection system (IDS) data and/or intrusion protection system (IPS) data, firewall log data, web application firewall log data, HTTP proxy log data, HTTP traffic log data, and the like. Further, the information can include URLs, AJAX requests and/or responses, HTTP verbs, parameters, data, form values, cookies, post requests, query and/or body parameters, user identifiers, passwords, or any other information that may be communicated via HTTP. The log files 124, 134, 144 and/or 154 can implement any suitable data structures. Examples of such structures include, but are not limited to, World Wide Web Consortium (W3C) log files, extensible markup language (XML) documents, comma separate values (CSV), HTTP archive files (HAR files), and the like.

The system 100 also can include the security client 160. In one embodiment, the security client 160 can be a different machine that the application client 130. In another embodiment, the security client 160 can be the same machine as the application client 130. In the embodiment where the security client 160 is a different machine than the application client(s) 130, the security client 160 can be any processing system that includes at least one processor. In such embodiment, the security client 160 further can include memory elements, such as local memory and/or one or more bulk storage devices, as will be described herein.

The security client 160 can include a security scanner 162. The security scanner 162 can be an application configured to access the web application 122 via the communication network 110 to in order to retrieve information provided by the web application 122 and/or provide information to the web application 122. More particularly, the security scanner 162 can automatically interact with the web application 122 analyze the web application 122 in order to determine security vulnerabilities that may be present in the web application 122. When interacting with the web application 122, the security scanner 162 can access collected log file data 164. The collected log file data 164 can be a collection of data collected from the log files 124, 134, 144 and/or 154. The collected log file data 164 can comprise data corresponding to the 124, 134, 144 and/or 154 and/or data corresponding to the 124, 134, 144 and/or 154.

In one embodiment, the security scanner 162 can retrieve and collect data contained in the log files 124, 134, 144 and/or 154 and store such data locally or remotely in a suitable data storage device, and access such information when needed to analyze the web application 122. In another embodiment, the security scanner 162 can retrieve and collect the data contained in the log files 124, 134, 144 and/or 154 when needed. In yet another embodiment, a user can collect the data contained in the log files 124, 134, 144 and/or 154 and store such data in a suitable data storage device from which the security scanner 162 can access such information. Export and import operations, which are known in the art, can be used to collect the data, but the invention is not limited in this regard.

The data collected from the log files 124, 134, 144 and/or 154 can be identified for collection in any suitable manner. For example, the log files 124, 134, 144 and/or 154 can be searched for particular URLs associated with the web application 122, data pattern matching can be applied to search the log files 124, 134, 144 and/or 154 to identify particular data patterns or parameter names associated with the web application 122, or the like. Moreover, the data from the log files 124, 134, 144 and/or 154 can be entered into one or more XML documents, HAR files, or any other suitable data files, to facilitate scanning of the data to identify relevant information by the security scanner 162.

In order to analyze the web application 122, the security scanner 162 can create HTTP requests 166 based on the collected log file data 164, and receive HTTP responses 168 to the HTTP requests 166. Accordingly, the security scanner 162 can perform security analysis on the web application 122 using information previously exchanged between the web application and one or more of the client applications 132. Such information can be, for example, information exchanged during development of the web application 122, such as real form values entered by a user, dynamically generated URLs created from actual user interaction with the web application 122 (via the client application 132), AJAX requests which are properly submitted as a result of user interaction and include real parameter values. Thus, the security scanner 162 can exercise the web application 122 using information known to be pertinent to the web application, thereby ensuring that the information used during such testing is highly relevant to the web application 122.

In illustration, the security scanner 162 can process the collected log file data 164 to distil information relevant to security testing. For example, the security scanner 162 can identify the HTTP requests 136 contained in the collected log file data 164 and generate corresponding HTTP requests 166. The security scanner 162 can include in the HTTP requests 166 URLs, HTTP verbs, AJAX requests and/or responses, parameters, data, form values, cookies, post requests, query and/or body parameters, user identifiers, passwords, or any other information that may be communicated via HTTP. In this regard, the security scanner 162 can include a HTTP message parser configured to parse ASCII text from the collected log file data 164 and extract pertinent HTTP information. The HTTP message parser also can match information from a previous HTTP response 168 which lead to a subsequent HTTP request 166 being generated (i.e., stateful parsing). Stateful parsing can be implemented to leverage information about an HTML parameter type, for example by marking a certain parameter of a HTTP request 166 as a parameter originating from a form or a hyperlink. In some cases, cookies may expire or may only be associated with an original HTTP request 136. The security scanner 162 can refresh cookies used from the collected log file data 164 to associate such cookies with the HTTP requests 166 and ensure that the cookies are valid for use with the HTTP requests 166.

The collected log file data 164 may contain redundant information. In such case, the security scanner 162 can filter the information contained in the collected log file data 164, for example to remove redundant information corresponding to the HTTP requests 136 and HTTP responses 138. Further, when generating the HTTP requests 166, the security scanner 162 can transform data, or at least a portion of the data, from the collected log file data 164 into one or more data structures recognizable by the web application 122.

In one embodiment, various ones of the HTTP requests 136 can be redundant in the regard that they access the same web pages provided by the web application and enter data into the same forms. Although the data entered into the same forms may be different, the HTTP requests 136 can be filtered to exclude HTTP requests 136 that duplicate the process of entering data into the forms that another HTTP request 136 already has addressed, though this need not be the case.

Moreover, when generating the HTTP requests 166, the security scanner 162 can duplicate data entered by one or more corresponding HTTP requests 136, and/or enter data different than the data entered by the corresponding HTTP requests 136. For example, the security scanner 162 can generate an HTTP request 166 with form data that is different than form data contained in corresponding HTTP requests(s) 136, but is configured to specifically test for security vulnerabilities in the web application 122. In illustration, the URL and form parameter names identified by the HTTP request 166 can be the same as the URL and form parameter names identified by one or more HTTP requests 136, but the parameters submitted in the HTTP request 166 to correspond to the same form parameter names can be different. For instance, one or more hazardous payloads can be submitted in the HTTP requests 166 to test for security vulnerabilities that may be present in the web application 122. Accordingly, one or more hazardous payloads can be submitted to an identified URL via the HTTP request 166. The hazardous payload can be, for an example, data configured to perform SQL injection, cross-site scripting, command injection, or any other data configured to test the web application 122 for security vulnerabilities.

In some instances, the HTTP responses 168 may identify user inputs that are required. If such user inputs are contained in the collected log file data 164, the security scanner 162 can respond to such HTTP responses 168 with HTTP requests 166 that include collected data from the collected log file data 164. The invention is not limited in this regard, however. For example, if the HTTP response 168 requires pertains to a challenge-response test used in computing (CAPTCHA), the security scanner 162 can be configured to prompt a user of the security scanner 162 to enter user inputs requested by the CAPTCHA. In other circumstances, the security scanner can respond to an HTTP response 168 with an HTTP response 168 containing one or more hazardous payloads configured to test for security vulnerabilities of the web application 122.

While generating the HTTP requests 166 and receiving the HTTP responses 168, the security scanner 162 can perform security validation of the web application, for example by analyzing the HTTP responses 168. The security scanner 162 further can output the results of the validation, for example by outputting the results to another log file and/or presenting the results to a user.

Figure 2:
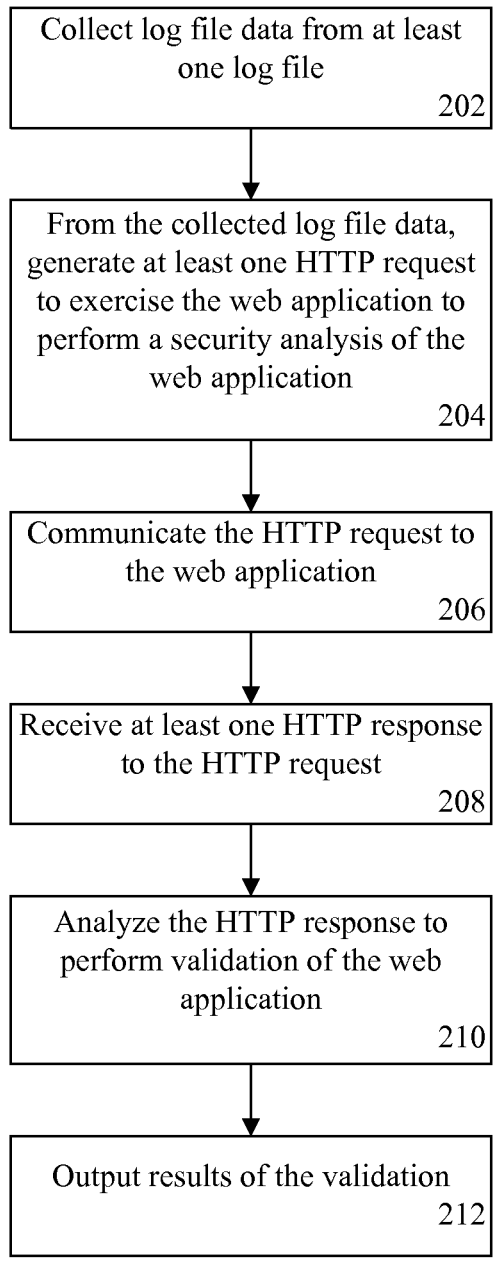
FIG. 2 is a flow chart illustrating a method of dynamically scanning a web application in accordance with another embodiment of the present invention.

FIG. 2 is a flow chart illustrating a method 200 of dynamically scanning a web application in accordance with another embodiment of the present invention. At step 202, log file data can be collected from one or more log files. As noted, such log files can be maintained by various systems, for example an application client on which a client application is executed to access the web application, a web server that hosts the web application, network infrastructure of a communication network to which an application client on which a client application is executed is communicatively linked, and/or network infrastructure of a communication network to which a web server that hosts the web application is communicatively linked. The network infrastructure can include one or more nodes of a communication network.

At step 204, from the collected log file data, at least one HTTP request can be generated to exercise the web application to perform a security analysis of the web application. For example, the HTTP request can identify URLs, HTTP verbs, AJAX requests and/or responses, parameters, data, form values, cookies, post requests, query and/or body parameters, user identifiers, passwords, or any other information that may be communicated via HTTP. At step 206, the HTTP request can be communicated to the web application.

At step 208, at least one HTTP response can be received to the HTTP request. For example, the HTTP response can be received from the web application. At step 210, the HTTP response can be analyzed to perform validation of the web application. At step 212, the result of the validation can be output, for example to a data file or to a user, for example via a display of a security client configured to execute a security scanner.

Figure 3:
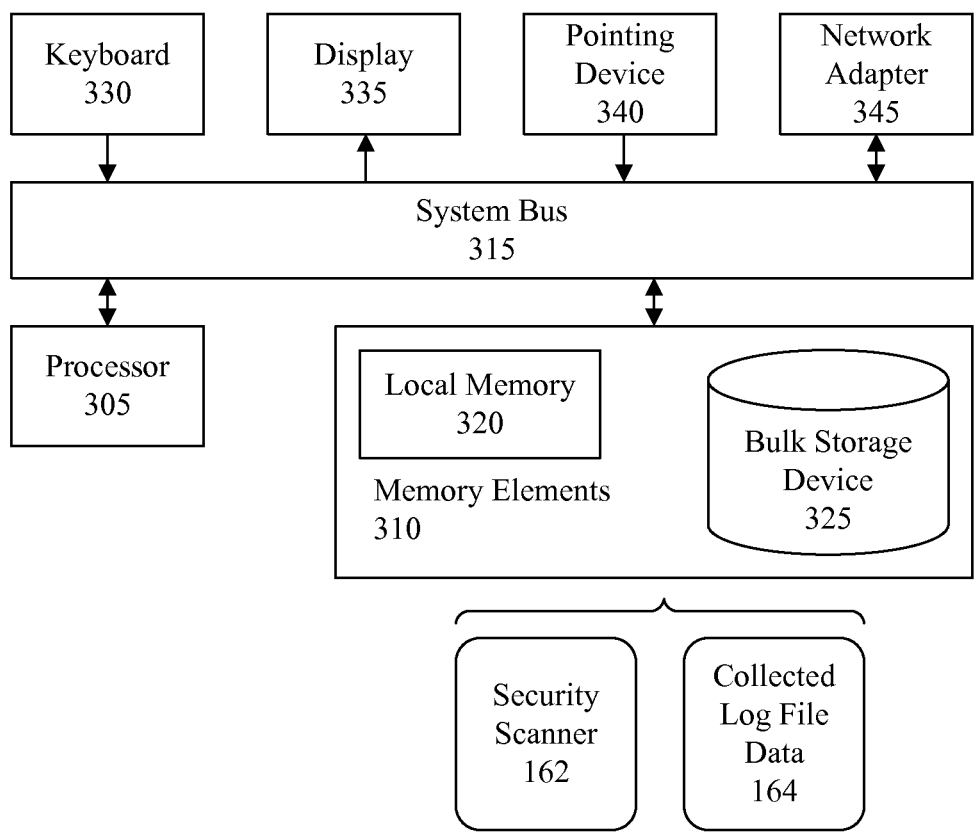
FIG. 3 is a block diagram illustrating a security client in accordance with one embodiment of the present invention.

FIG. 3 is a block diagram illustrating a security client 160 in accordance with one embodiment of the present invention. The security client 160 can include at least one processor 305 coupled to memory elements 310 through a system bus 315 or other suitable circuitry. As such, the security client 160 can store program code within memory elements 310. The processor 305 can execute the program code accessed from the memory elements 310 via system bus 315. In one aspect, for example, the security client 160 can be implemented as computer that is suitable for storing and/or executing program code. It should be appreciated, however, that the security client 160 can be implemented in the form of any system including a processor and memory that is capable of performing the functions and/or operations described within this specification.

The memory elements 310 can include one or more physical memory devices such as, for example, local memory 320 and one or more bulk storage devices 325. Local memory 320 refers to random access memory or other non-persistent memory device(s) generally used during actual execution of the program code. Bulk storage device(s) 325 can be implemented as a hard drive or other persistent data storage device. The security client 160 also can include one or more cache memories (not shown) that provide temporary storage of at least some program code in order to reduce the number of times program code must be retrieved from bulk storage device 325 during execution.

Input/output (I/O) devices such as a keyboard 330, a display 335, and a pointing device 340 optionally can be coupled to the security client 360. The I/O devices can be coupled to the security client 160 either directly or through intervening I/O controllers. One or more network adapters 345 also can be coupled to the security client 160 to enable the security client 160 to become coupled to other systems, computer systems (e.g., a web server), remote printers, and/or remote storage devices through intervening private or public networks. Modems, cable modems, and Ethernet cards are examples of different types of network adapters 345 that can be used with the security client 160.

As pictured in FIG. 3, the memory elements 310 can store a security scanner 162. The security scanner 162, being implemented in the form of executable program code, can be executed by the security client 160 and, as such, can be considered part of the security client 160. The security client 160 can access collected log file data 164. The collected log file data 164 can be stored in the memory elements 310, or stored on another data storage device or system from which the security client 160 may access the collected log file data 164. For example, the security client 160 may access the collected log file data 164 directly from corresponding data logs when needed, a user may collect the log file data 164 and provide the collected log file data 164 to the security client 160. The security scanner 162 can perform the processes and methods described herein to perform security scanning of a web application, perform security validation of the web application, and output the results of the security validation. As used herein, "outputting" and/or "output" can mean storing in memory elements 310, for example, writing to a file stored in memory elements 310, writing to the display 335 or other peripheral output device, playing audible notifications, sending or transmitting to another system, exporting, or the like.

Like numbers have been used to refer to the same items throughout this specification. In one embodiment, the workflow server can be implemented as IBM® Rational® AppScan® (IBM, Rational and AppScan are trademarks of International Business Machines Corporation in the United States, other countries, or both).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of dynamically scanning a web application to perform a security analysis of the web application, the method comprising:

collecting log file data from at least one log file, collecting the log file data comprising matching information from a previous HTTP request, which lead to a subsequent HTTP request being generated, using stateful parsing to identify information about at least one HTML parameter type by marking a certain parameter of the previous HTTP request as a parameter originating from a form or a hyperlink;

entering data from the collected log file data into at least one data file;

scanning the at least one data file to identify information relevant to security testing;

from the identified information relevant to the security testing, generating, using a processor, at least a first HTTP request to exercise a web application to perform the security analysis of the web application, the first HTTP request corresponding to a second HTTP request generated by prior use or development of the web application and contained in the log file, the first HTTP request including form data that is different than form data contained in the second HTTP request and configured to specifically test for security vulnerabilities in the web application;

communicating the HTTP request to the web application;

receiving at least one HTTP response to the first HTTP request;

analyzing, using the processor, the HTTP response to perform validation of the web application; and outputting results of the validation.

2. The method of claim 1, further comprising:

filtering the collected log file data to remove redundant information from the collected log file data.

3. The method of claim 1, further comprising:
- transforming at least a portion of the collected log file data into at least one data structure recognizable by the web application; and
- including the data structure in the first HTTP request.

4. The method of claim 1, wherein the at least one log file comprises a log file maintained by an application client on which a client application is executed to access the web application.

5. The method of claim 1, wherein the at least one log file comprises a log file maintained by a web server that hosts the web application.

6. The method of claim 1, wherein the at least one log file comprises a log file maintained by network infrastructure of a communication network to which an application client on which a client application is executed is communicatively linked.

7. The method of claim 1, wherein the at least one log file comprises a log file maintained by network infrastructure of a communication network to which a web server that hosts the web application is communicatively linked.

8. The method of claim 1, further comprising:
- identifying at least one URL identified in the collected log file data;
- wherein generating at least the first HTTP request comprises submitting in the first HTTP request a hazardous payload to the URL.

* * * * *